US012202254B2

(12) United States Patent
Lo

(10) Patent No.: US 12,202,254 B2
(45) Date of Patent: Jan. 21, 2025

(54) PLATEN WITH EDGE SPIT OPENINGS

(71) Applicant: Hewlett-Packard Development Company, L.P., Spring, TX (US)

(72) Inventor: Kevin Lo, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 122 days.

(21) Appl. No.: 18/011,370

(22) PCT Filed: Jul. 3, 2020

(86) PCT No.: PCT/US2020/040820
§ 371 (c)(1),
(2) Date: Dec. 19, 2022

(87) PCT Pub. No.: WO2022/005489
PCT Pub. Date: Jan. 6, 2022

(65) Prior Publication Data
US 2023/0234379 A1 Jul. 27, 2023

(51) Int. Cl.
*B41J 11/06* (2006.01)
*B41J 15/04* (2006.01)

(52) U.S. Cl.
CPC ............. *B41J 11/06* (2013.01); *B41J 15/048* (2013.01)

(58) Field of Classification Search
CPC ................................ B41J 11/06; B41J 15/048
See application file for complete search history.

(56) References Cited

U.S. PATENT DOCUMENTS

| | | | | |
|---|---|---|---|---|
| 6,270,183 | B1 | 8/2001 | Gaarder | |
| 7,527,349 | B2 | 5/2009 | Jung et al. | |
| 7,828,407 | B2 | 11/2010 | Gomez et al. | |
| 8,556,409 | B2 | 10/2013 | Yearout et al. | |
| 10,252,530 | B2 | 4/2019 | Moya Rojo et al. | |
| 2005/0093946 | A1 | 5/2005 | Tanner et al. | |
| 2009/0058891 | A1 | 3/2009 | Kershisnik et al. | |
| 2014/0165865 | A1* | 6/2014 | Chover Lopez | B41J 11/06 101/395 |
| 2020/0254789 | A1* | 8/2020 | Martin Orue | B41J 11/007 |

* cited by examiner

*Primary Examiner* — Sharon Polk
(74) *Attorney, Agent, or Firm* — Brooks, Cameron & Huebsch, PLLC

(57) ABSTRACT

Examples of a platen for a printing device are described. In some examples, the platen may include a spit opening located at a side of the platen. In some examples, the spit opening may include an angled lead-in edge to facilitate travel of print media in the printing device. In some examples, an inside portion of a leading edge of the print media contacts the angled lead-in edge of the spit opening and pulls an outside edge of the print media up as the print media moves across the platen.

13 Claims, 9 Drawing Sheets

PLATEN WITH EDGE SPIT OPENINGS

BACKGROUND

A printing device may print on print media. For example, a printbar may deposit a print substance (e.g., ink or pigment) on the print media. In some examples, the printbar may include a fluidic die to deposit the print substance on the print media.

BRIEF DESCRIPTION OF THE DRAWINGS

Various examples will be described below by referring to the following figures.

Figure 1:
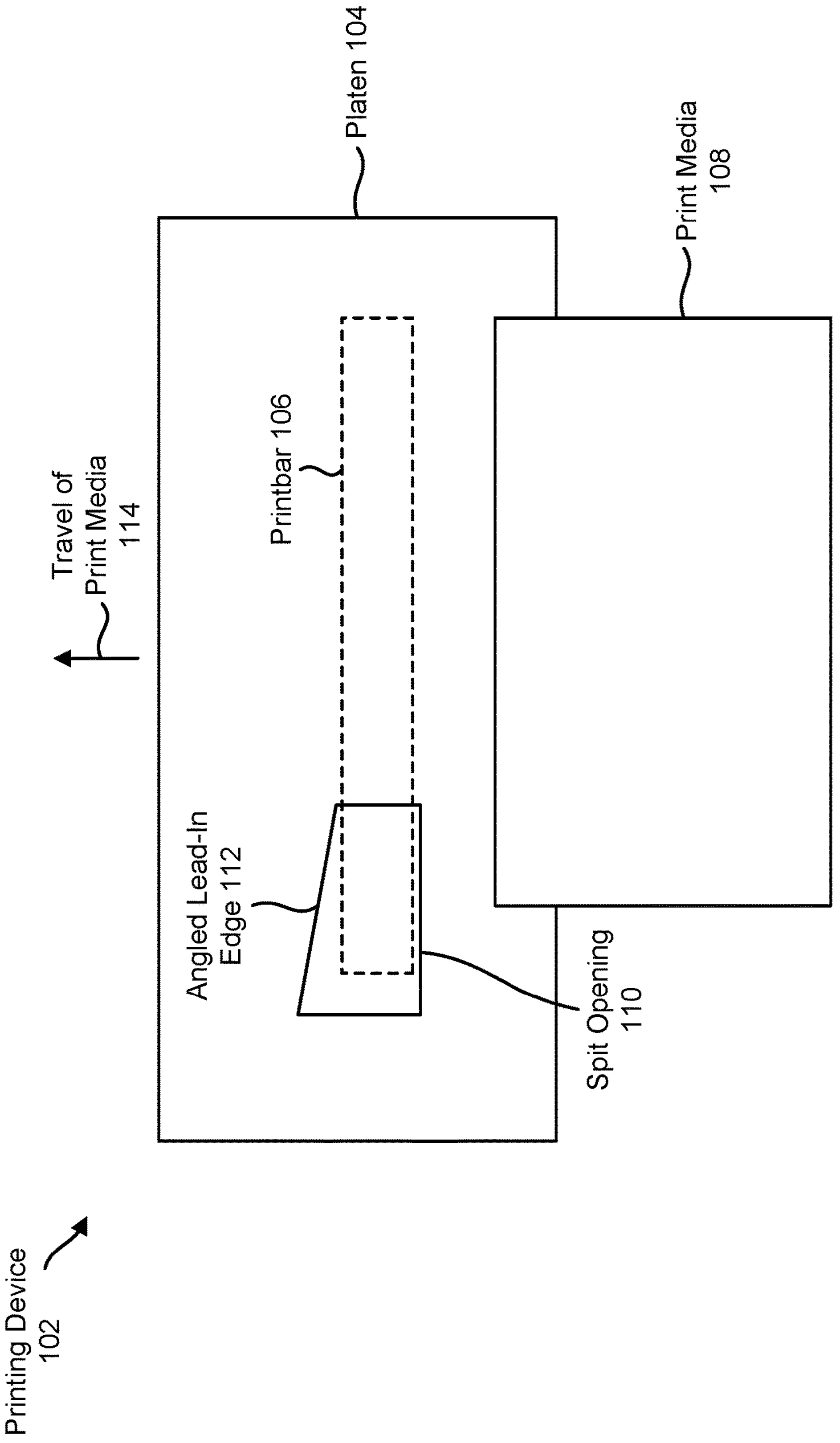
FIG. 1 illustrates an example of a platen for a printing device with a spit opening.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations in accordance with the description; however, the description is not limited to the examples and/or implementations provided in the drawings.

DETAILED DESCRIPTION

Printing devices may deposit a print substance (also referred to as printing fluid) on print media. In some examples, the printing device may include an ejection device that deposits the print substance, An ejection device may include a fluidic die (also referred to as a printhead die) that includes nozzles to eject the print substance.

In some examples, the print substance may include printing agents or colorants. The printing device may apply the print substance to a substrate. A substrate is a superset of print media, such as plain paper, and can include any suitable object or materials to which a print substance from a printing device is applied including materials, such as powdered build materials, for forming three-dimensional articles. In addition, in some examples, a printing device may print on various print media such as inanimate objects, skin, books, wood, plastic, metal, concrete, wallpaper, or other materials. Print substances, including printing agents and colorants, can include liquid inks, or other suitable marking material that may or may not be mixed with fusing agents, detailing agents, or other materials and can be applied to the substrate.

In other examples, the printing device may be used in life-science applications (e.g., lab-on-chip fluidic designs), bio-printing, printed manufacturing features and sensors for additive manufacturing applications. These applications may use a print substance other than ink or toner.

In some cases, the printing device may store the print substance in an internal reservoir. For example, the printing device may include a continuous ink supply system (CISS) for transporting the print substance from the internal reservoir to an ejection device.

In some examples, the printing device may include multiple print substance reservoirs. For example, different print substance reservoirs may be used for storing print substances of different colors.

In some examples, the ejection device of the printing device may be a printbar. For example, in a pagewide printing device, the printhead may include a number of components (e.g., actuators and/or nozzles) for ejecting the print substance. These components may be arranged to span the width of the print media forming a bar. The printhead with this arrangement is referred to as a printbar.

In some examples, a printing device may perform a spit operation from time to time to maintain the proper functionality of the nozzles used to eject the print substance. For instance, if a nozzle is unused for a period of time, then the print substance may dry out or harden within the nozzle. To prevent damage to the nozzle, the printing device may perform a spit operation. In this case, an amount of print substance is ejected out of the nozzle. In some examples, this excess print substance may be collected in a reservoir (referred to herein as a spittoon). The spit operation may ensure that the print substance does not dry out or harden, thus preserving the health of the nozzle.

In pagewide printing, the printbar may be sized to print on a certain print media size (e.g., A3). However, the printing device may also print on smaller print media sizes (e.g., A4). In this case, a portion of the nozzles of the printbar may be unused on the sides of the printbar. To prevent damage to these unused nozzles, a spit operation may be performed for the unused portions of the printbar. As used herein, unused portions of the printbar may refer to portions of the printbar that are not exposed to the print media.

In other examples, the printing device may print on a continuous supply of print media. This type of printing may be referred to as continuous printing or continuous web printing. In some examples, the print media may be a roll of print media (e.g., paper, vinyl, etc.). A leading edge of the print media roll may be fed into the printing device. Upon printing onto the print media roll, the print media may be rolled onto a spool or processed (e.g., cut, collated, etc.).

A challenge faced with continuous printing is performing a spit operation for the unused portions of the printbar when the print media size is less than the width of the printbar. For example, with individual print media sheets, the printing device may perform a spit operation between sheets. However, with a continuous roll of print media, there are no gaps between sheets in which to perform the spit operation.

Examples of platens with edge spit openings are described herein. The spit openings may provide a way for the printing device to perform a spit operation for unused portions of the printbar.

FIG. 1 illustrates an example of a platen 104 for a printing device 102 with a spit opening 110. FIG. 1 is a top down view of the platen 104. Examples of printing devices 102 include printers, copiers, fax machines, multifunction devices including additional scanning, copying, and finishing functions, all-in-one devices, pad printers to print images on three dimensional objects, three-dimensional printers (additive manufacturing devices), and bio-medical fluidic printers.

In some examples, the printing device 102 may include a printbar 106 that is used to emit a print substance onto print media 108. It should be noted that the printbar 106 is depicted with dashed lines in FIG. 1 to distinguish it from the platen 104. The printbar 106 may operate according to a printing technology (e.g., thermal inkjet, piezoelectric ink-jet, additive printing, etc.). In some examples, a print substance may be stored in a print substance reservoir of the printing device 102. The print substance may be transported from the print substance reservoir to the printbar 106.

In some examples, the printbar 106 may include a number of fluidic dies that include nozzles and circuitry to eject the print substance out of the printbar 106. In some examples, the fluidic dies may be arranged in a linear band. In other words, the printbar 106 may be an array of silicon chips arranged in a single long slit.

In some examples, the width of the printbar 106 may correspond to a width of print media 108. For instance, the width of the printbar 106 may be sized to a certain print media 108 (e.g., A3). It should be noted that the printing device 102 may also print on print media 108 having a width less than the width of the printbar 106. For instance, although the printbar 106 may be sized for A3 pagewide printing, the printing device 102 may also print on A4 print media 108 using a subset of the nozzles of the printbar 106.

In some examples, the printing device 102 may include a platen 104. As used herein, the platen 104 may be a structure located opposite the printbar 106 within the printing device 102. The platen 104 may guide the print media 108 through the printing device 102.

In some examples, the platen 104 may be primarily defined with a rectangular profile. For example the perimeter of the platen 104 facing the printbar 106 may have a rectangular shape. In some examples, the surface of the platen 104 opposite the printbar 106 may be a flat surface.

The platen 104 may include a number of features to manipulate the shape and position of the print media 108. For example, the platen 104 may include ribs, ramps or other features (not shown) to position the print media 108 relative to the printbar 106. These features may protrude from the surface of the platen 104 such that the print media 108 does not contact the flat surface of the platen 104.

In some examples, the platen 104 described herein may be positioned in a fixed location of the printing device 102 relative to the printbar 106. For example, once installed within the printing device 102, the platen 104 may remain in a fixed location. In this example, the spit opening 110 may remain in the print position of the printbar 106. In other examples, the platen 104 may move relative to the printbar 106. For example, the platen 104 may move in a linear motion (e.g., up-down, side-to-side) relative to the printbar 106. In other examples, the printbar 106 may move and the platen 104 may remain stationary within the printing device 102.

It should be noted that in some examples, the platen 104 may be interchangeable. For instance, a platen 104 with certain characteristics may be exchanged for another platen 104 with different characteristics. In some cases, the platens 104 may include a spit opening 110 or multiple spit openings 110 sized for certain print media 108. For example, a first platen 104 with a spit opening 110 (or multiple spit openings 110) sized for a first print media size may be replaced with a second platen 104 with a spit opening 110 (or multiple spit openings 110) sized for a second print media size.

Figure 4:
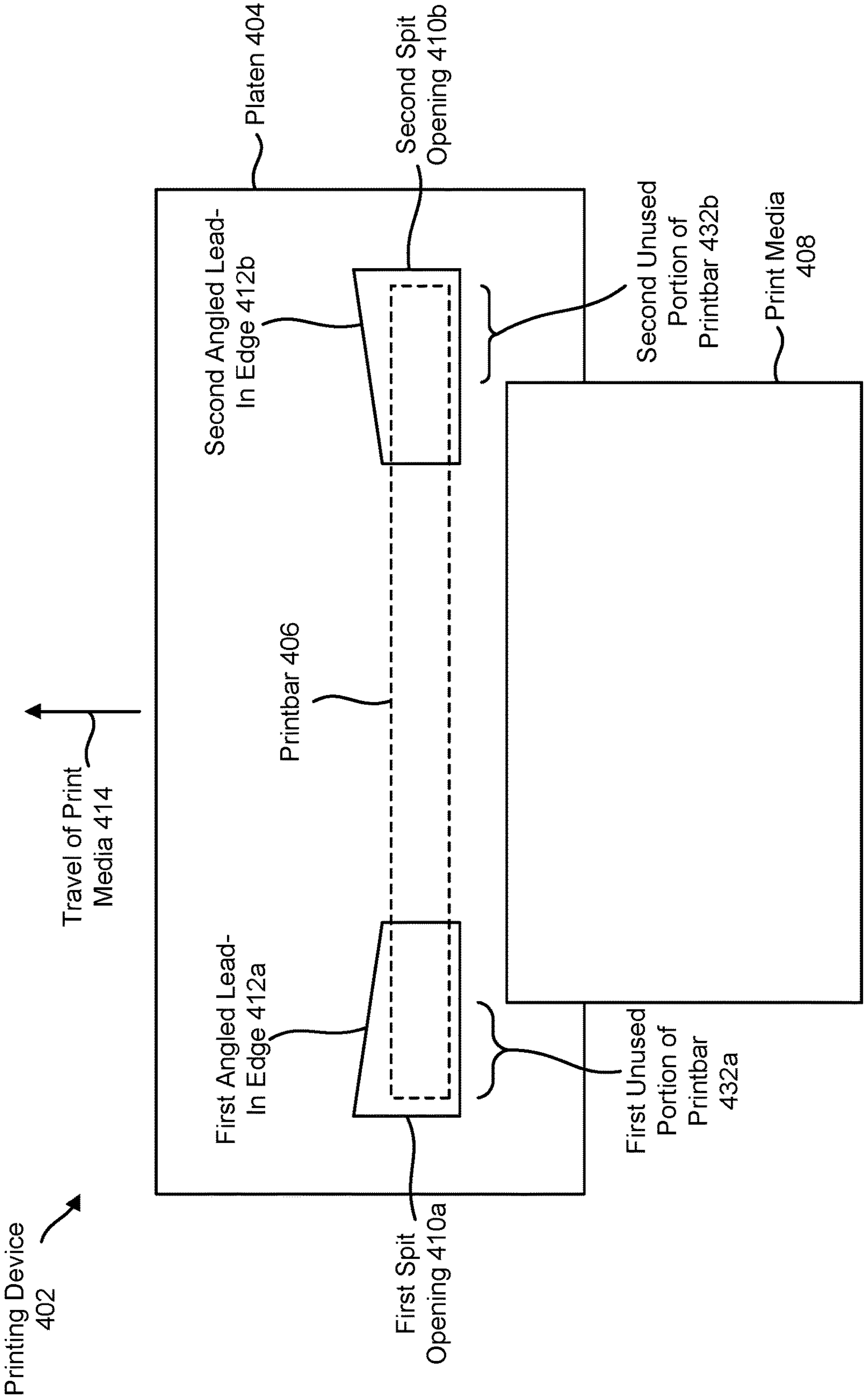
FIG. 4 illustrates an example of a platen with two spit openings for a printing device.
Figure 5:
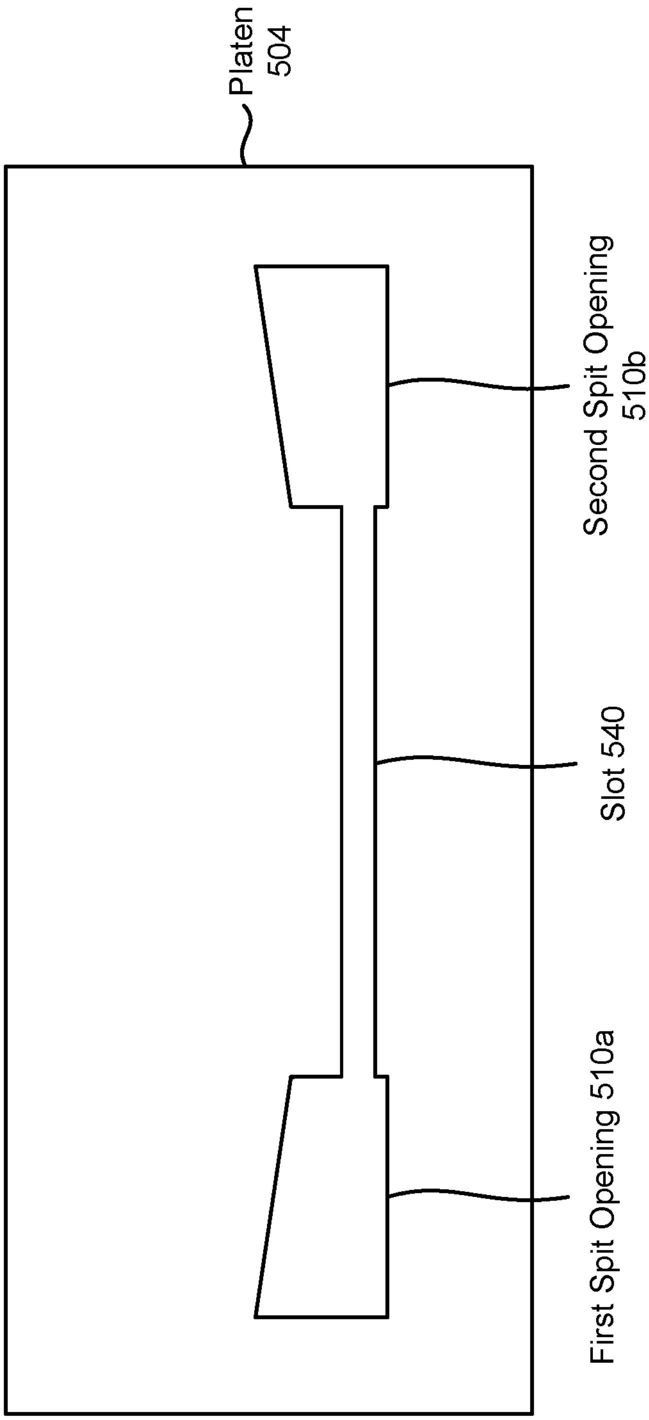
FIG. 5 illustrates another example of a platen with two spit openings for a printing device.
Figure 6:
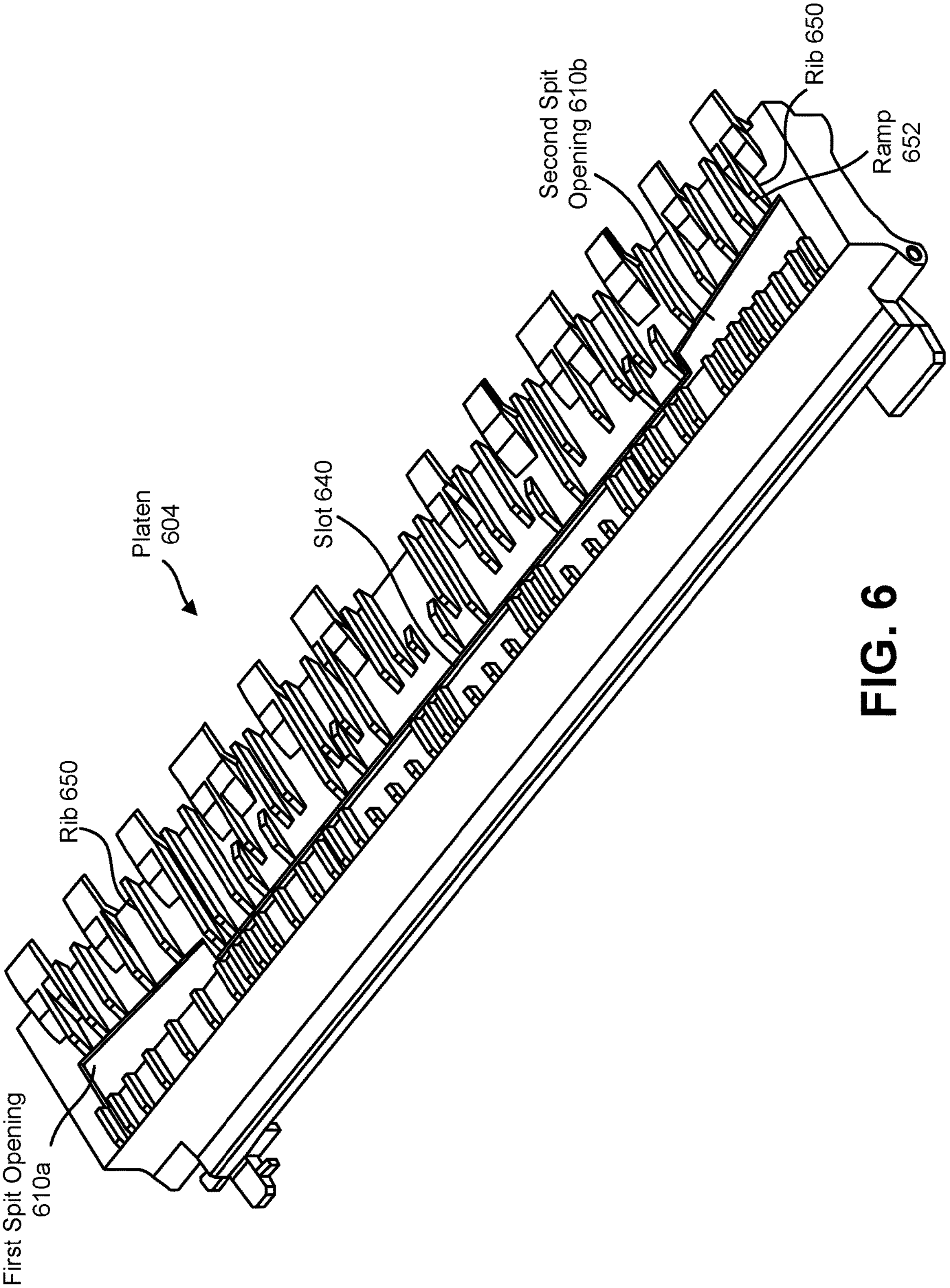
FIG. 6 is a perspective view illustrating an example of a platen with two spit openings.

In some example, the platen 104 may include a spit opening 110. The spit opening 110 may be located at a side of the platen 104. The spit opening 110 may be an orifice in the surface of the platen 104. The spit opening 110 may allow a portion of the nozzles of the printbar 106 to spit into a spittoon. It should be noted that the example illustrated in FIG. 1 includes a single spit opening 110. In other examples, the platen 104 may include two spit openings on each side of the platen 104, as illustrated in FIGS. 4-6.

The spit opening 110 may be located on the platen 104 to align with the printbar 106. For example, a portion of the printbar 106 may align with the spit opening 110 such that the nozzles in the aligned portion may eject the print substance through the spit opening 110. This may allow these nozzles to spit into a spittoon of the printing device 102.

In some examples, the spit opening 110 may include an angled lead-in edge 112 to facilitate travel 114 of the print media 114 in the printing device 102. The direction of travel 114 of the print media 108 relative to the platen 104 is shown. The angled lead-in edge 112 may aid in preventing the leading edge of the print media from crashing into the spit opening 110, which may cause the printing device 102 to jam, as described in connection with FIG. 2.

In some examples, the spit opening 110 may facilitate printing on a continuous roll of print media 108 while unused portions of the printbar 106 spit into the spit opening 110. For example, the width of the print media roll may be less than the width of the printbar 106. While a continuous roll of print media 108 is fed through the printing device 102, unused portions of the printbar 106 may spit into the spit opening 110. As used herein, the printbar 106 may “spit” into the spit opening 110 by emitting a print substance into the spit openings 110 from a subset of nozzles. For example, the subset of nozzles may correspond to nozzles of the printbar 106 that are unused due to the width of the print media 108 being less than the width of the printbar 106.

The examples of the platen 104 and spit opening 110 may facilitate longer periods of continuous printing. The use of the spit opening 110 as described herein may reduce the frequency of the printbar 106 returning to a non-printing spit position. Furthermore, the spit opening 110 may enable continuous web printing of a print media size (e.g., A4) with a larger printbar 106 (e.g., an A3 printbar) without disabling functionality of the printbar 106.

Figure 2:
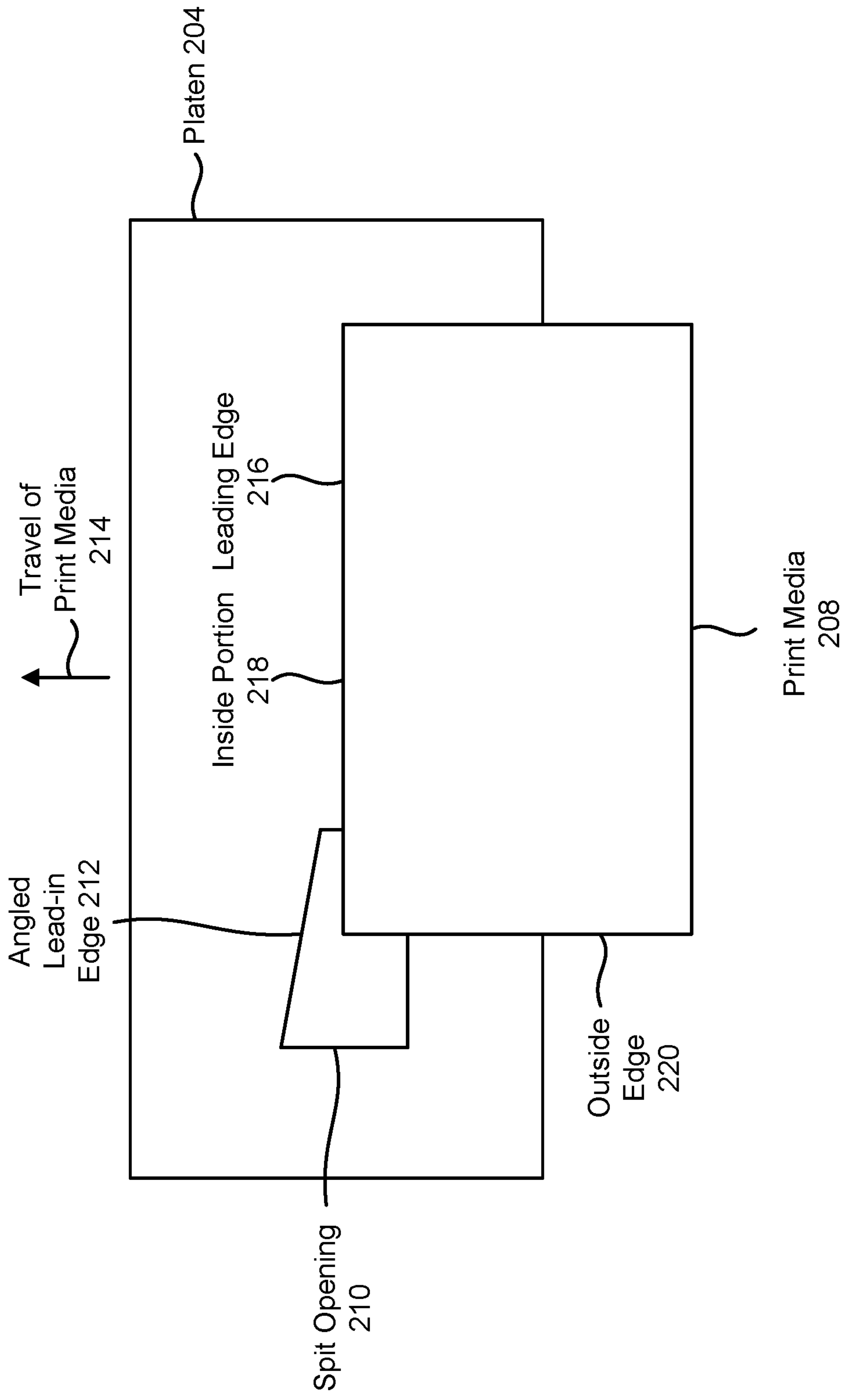
FIG. 2 illustrates an example of print media travel over the spit opening of the platen.

Referring now to FIG. 2, the print media 208 may travel 214 across the surface of the platen 204. An inside portion 218 of a leading edge 216 of the print media 208 may contact the angled lead-in edge 212 of the spit opening 210. The contact by the inside portion 218 may pull the outside edge 220 of the print media up as the print media 208 moves across the platen 204. The angled lead-in edge 212 may ensure that the inside portion 218 on the print media 208 contacts the angled lead-in edge 212 before the corner of the print media 208, This may help prevent the corner of the print media 208 from crashing into the spit opening 210.

The angled lead-in edge 212 of the spit opening 210 becomes farther away as the width of the spit opening 210 increases. In other words, the leading edge 216 of the print media 208 may approach the angled lead-in edge 212 such that the inside portion 218 of the print media 208 contacts first and pulls the outer edge 220 of the sheet up as it continues to travel in the print direction.

Figure 3:
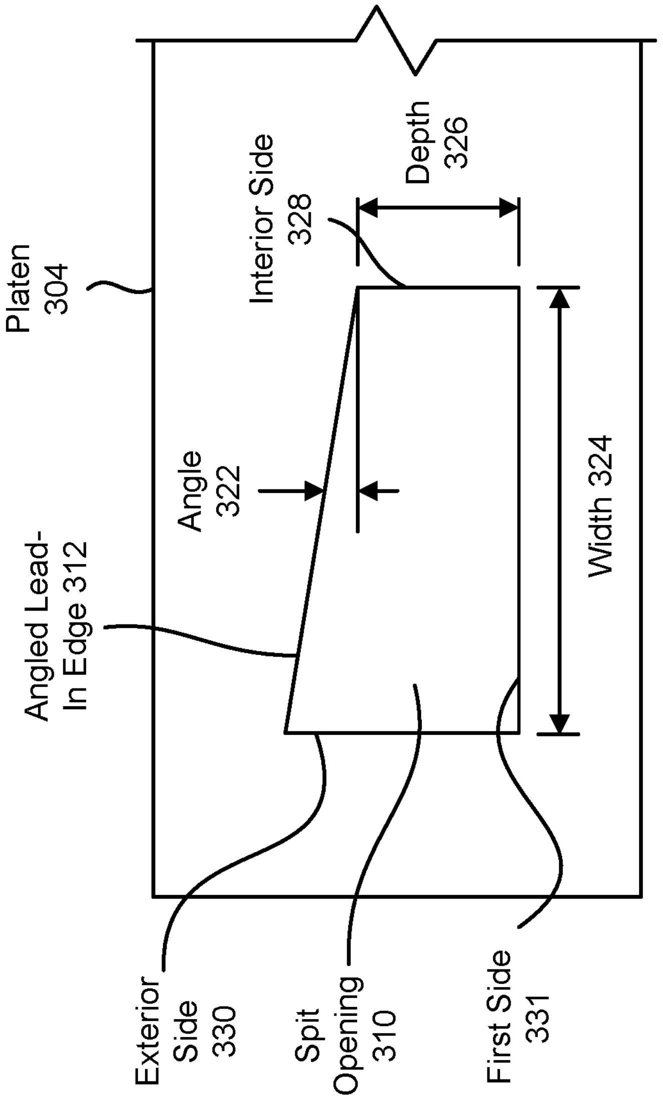
FIG. 3 illustrates example characteristics of the spit opening.

Referring now to FIG. 3, in some examples, the spit opening 310 may have a quadrilateral shape. For example, the spit opening 310 may be defined by four sides. An interior side 328 and an exterior side 330 may be oriented parallel with the travel of the print media, A first side 331 and the angled lead-in edge 312 may be oriented approximately perpendicular to the print media travel. In this example, the print media travels over the first side 331 before encountering the angled lead-in edge 312. In some examples, the angled lead-in edge 312 may have an angle 322 within a range of 5-20 degrees.

In some examples, the interior side 328 may be located toward an interior portion of the platen 304. The exterior side 330 may be located toward an exterior portion of the platen 304. The exterior side 330 of the spit opening 310 may be offset from the exterior side of the platen 304 a certain distance. The exterior side 330 may have a length that is greater than the length of the interior side 328.

In some examples, the depth 326 of the spit opening 310 (corresponding to the length of the fist side 328) may be based on the width of the printbar. For example, the depth 326 of the spit opening 310 may be as wide as the width of the printbar.

In some examples, the width 324 of the spit opening 310 may be based on the width of the smallest print media that is to be printed. For example, the width 324 may be long enough to overlap the edge of the smallest print media. For example, if the printbar is sized for A3 print media, the width 324 may be sized to extend past the side of A4 print media.

In some examples, the spit opening 310 may be sized for aerosol collection of a print substance emitted by a portion of a printbar of the printing device. For example, the printing device may generate suction to facilitate collection of the print substance into a spittoon during a spit operation. The emitted print substance may generate an aerosol. The spit opening 310 may be sized to ensure that the negative pressure is sufficient to draw the aerosolized print substance through the spit opening 310 and into the spittoon. Other examples of configurations of the spit opening are described in connection with FIGS. 7-9.

FIG. 4 illustrates an example of a platen 404 with two spit openings 410*a-b* for a printing device 402. In this example, a first spit opening 410*a* may be located at a first side of the platen 404 and a second spit opening 410*b* may be located at a second side of the platen 404. The spit openings 410*a-b* may be implemented as described in connection with FIGS. 1-3. For example, the spit openings 410*a-b* may each include an angled lead-in edge 412*a-b* to facilitate travel 414 of the print media 408 in the printing device 402.

In this example, the two spit openings 410*a-b* may be narrow in the interior portion of the platen 404. The spit openings 410*a-b* may become wider closer to the edges of the platen 404 due to the angle of the angled lead-in edges 412*a-b*.

In this example, the two spit openings 410*a-b* may be positioned to extend just beyond the printbar 406. The width of the two spit openings 410*a-b* may be such that the spit openings 410*a-b* extend beyond the print media 408 centered on the platen 404.

In some examples, the print media 408 may be centered on the platen 404. In other words, the print media 408 may be center-justified. In this case, the printbar 406 may spit into both spit openings 410*a-b*.

In other examples, the print media 408 may not be centered on the platen 404. For example, the print media 408 may be right-justified or left-justified. In this case, the printbar 406 may spit into either the first spit opening 410*a* or the second spit opening 410*b* depending on which side the print media 408 is located on the platen 404. In some examples, the spit openings 410*a-b* may have different sizes based on the printing device 402 is configured to receive the print media 408 (e.g., center-justified, right-justified, left-justified, etc.)

The printbar may print on the print media 408 (e.g., a continuous roll) while unused portions 432 of the printbar 406 spit into the spit openings 410*a-b*. For example, a first unused portion 432*a* of the printbar 406 may spit into the first spit opening 410*a*. A second unused portion 432*b* of the printbar 406 may spit into the second spit opening 410*b*.

FIG. 5 illustrates another example of a platen 504 with two spit openings 510*a-b* for a printing device. The two spit openings 510*a-b* may be implemented as described above.

In this example, a slot 540 may connect the first spit opening 510*a* and the second spit opening 510*b*. The slot 540 may be an opening through the platen 504. The width of the slot 540 between the spit openings 510*a-b* may be based on the width of the print media. For example, the slot width may be approximately as wide as the width of the smallest print media that is to be printed.

In some examples, the printbar may emit the print substance through the slot 540 and the spit openings 510*a-b*. For example, when print media is traveling across the platen 504, unused portions of the printbar may spit into the spit openings 510*a-b*. While printing the print media, the used portions of the printbar may be obstructed by the print media. When the print media is clear of the platen 504, the printbar may also spit into the slot 540.

It should be noted, that the printbar may also spit onto the print media. For example, with a continuous print media roll, the printbar may spit onto the print media for those portions of the printbar that are blocked by the print media.

FIG. 6 is a perspective view illustrating an example of a platen 604 with two spit openings 610*a-b*. In this example, a slot 640 connects the first spit opening 610*a* and the second spit opening 610*b*.

In this example, the platen 604 includes a number of ribs 650 and ramps 652 to aid in the travel of the print media. It should be noted that this example includes a number of lead-in ribs 650 located at the first sides and the angled lead-in edges of the spit openings 610*a-b*. The lead-in ribs 650 may include a ramp 652 to further guide the print media.

In some examples, the angle of the ramp 652 for a lead-in rib 650 of the spit openings 610*a-b* may be based on the span of the spit openings 610*a-b* at the location of the lead-in rib 650. For example, a spit opening 610 may have a narrow span toward the interior side of the platen 604 and a wide span toward the exterior side of the platen 604. In this case, a lead-in rib 650 located toward the interior side of the spit opening 610 may have a steeper ramp 652 than a lead-in rib 650 located toward the exterior side of the spit opening 610.

Figure 7:
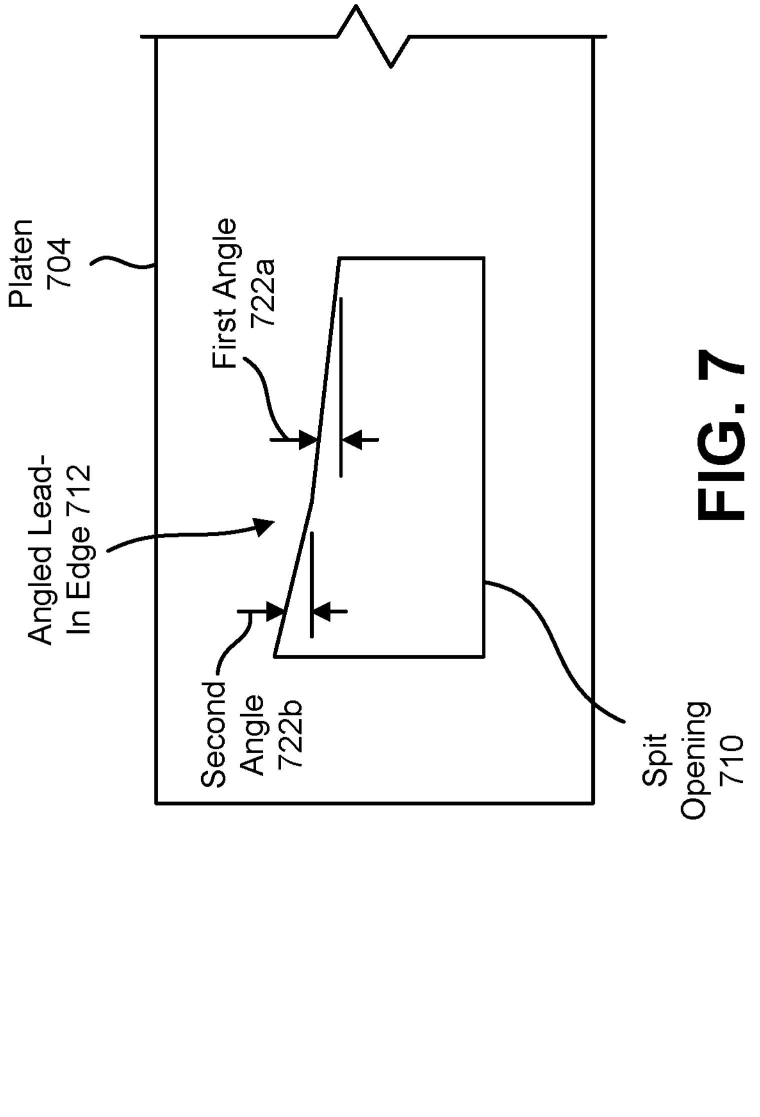
FIG. 7 illustrates another example of a spit opening for a platen.

FIG. 7 illustrates another example of a spit opening 710 for a platen 704. In some examples, the angled lead-in edge 712 may be defined by multiple angles. In this example, the angled lead-in edge 712 includes a first angle 722*a* and a second angle 722*b*. In this example, the second angle 722*b* is greater than the first angle 722*a*. It should be noted that in other examples, the angled lead-in edge 712 may include more than two angles.

Figure 8:
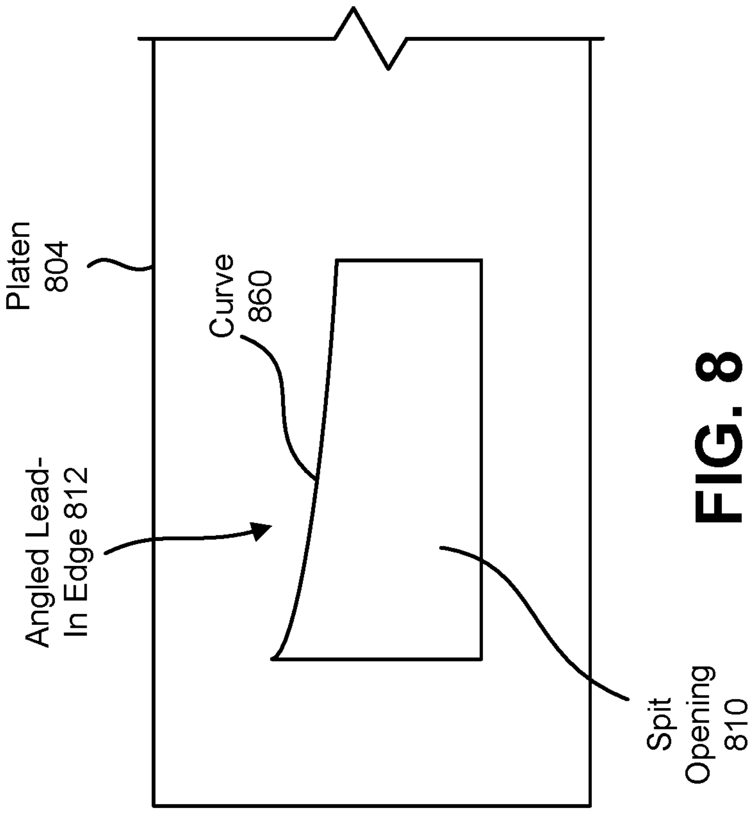
FIG. 8 illustrates another example of a spit opening for a platen.

FIG. 8 illustrates yet another example of a spit opening 810 for a platen 804. In some examples, the angled lead-in edge 812 may be defined by a curve 860, In this example, the curve 860 is convex with respect to the spit opening 810. In other examples, the curve 860 may be concave with respect to the spit opening 810. In yet other examples, a portion(s) of the curve 860 may be convex and another portion(s) of the curve 860 may be concave.

Figure 9:
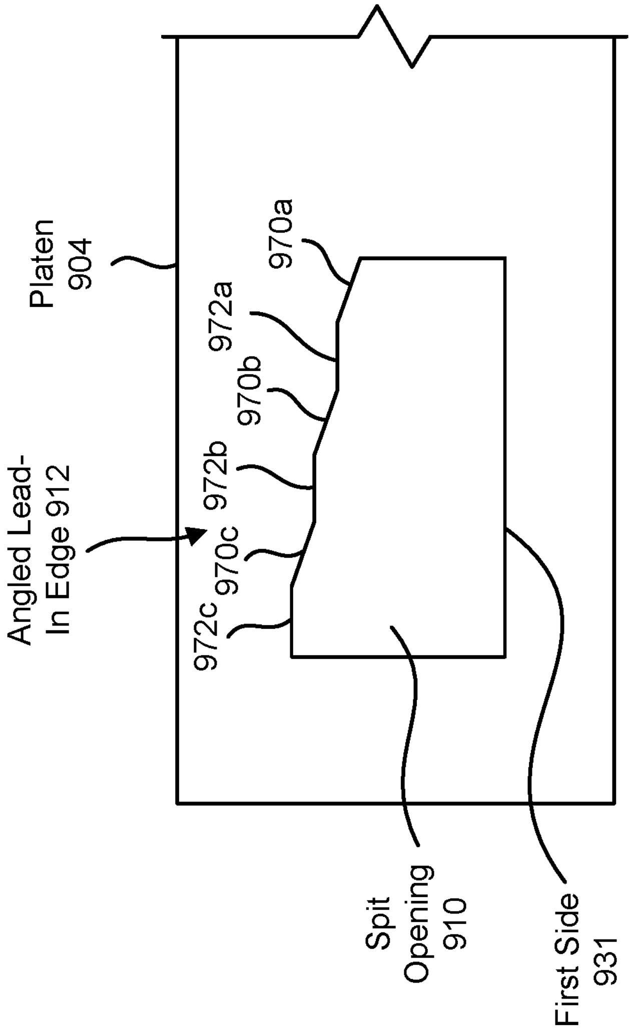
FIG. 9 illustrates yet another example of a spit opening for a platen.

FIG. 9 illustrates yet another example of a spit opening 910 for a platen 904. In this example, the angled lead-in edge 912 is defined by multiple interrupted angles. In some examples, the angled lead-in edge 912 may be defined by a number of angled portions 970*a-c* and a number of parallel portions 972*a-c*. As used herein, the angled portions 970*a-c* are angled with respect to the first side 931 of the spit opening 910. The parallel portions 972*a-c* may be parallel to the first side 931 of the spit opening 910. In this example, the angled portions 970*a-c* and the parallel portions 972*a* may form an angled lead-in edge 912 with a saw-toothed shape. This saw-toothed shape may be referred to as interrupted angles. It should be noted that while three angled portions 970*a-c* and three parallel portions 972*a c* are included in this example, in other examples, a different number of angled portions and parallel portions may be included. Furthermore, the angles of the angled portions 970*a-c* may be the same or may differ.

It should be noted that while various examples of systems and methods are described herein, the disclosure should not be limited to the examples. Variations of the examples described herein may be implemented within the scope of the disclosure. For example, functions, aspects, or elements of the examples described herein may be omitted or combined.

The invention claimed is:

1. A platen for a printing device, comprising:
- a spit opening located at a side of the platen, the spit opening comprising an angled lead-in edge to facilitate travel of print media in the printing device, wherein the spit opening comprises an interior side located toward an interior portion of the platen.

2. The platen of claim 1, wherein an inside portion of a leading edge of the print media contacts the angled lead-in edge of the spit opening and pulls an outside edge of the print media up as the print media moves across the platen.

3. The platen of claim 1, wherein the platen comprises lead-in ribs located at a first side and the angled lead-in edge to the spit opening to facilitate movement of the print media over the spit opening.

4. The platen of claim 1, wherein the spit opening comprises a quadrilateral shape.

5. The platen of claim 1, wherein the spit opening comprises:
- an exterior side located toward an exterior portion of the platen, the exterior side having a length that is greater than the interior side.

6. A platen for a printing device, comprising:
- a first spit opening located at a first side of the platen, wherein the first spit opening comprises an exterior side located toward an exterior portion of the platen, the exterior side having a length that is greater than an interior side; and
- a second spit opening located at a second side of the platen, the spit openings each comprising an angled lead-in edge to facilitate travel of print media in the printing device.

7. The platen of claim 6, further comprising a slot connecting the first spit opening and the second spit opening.

8. The platen of claim 7, wherein a width of the slot between the spit openings is based on a width of the print media.

9. The platen of claim 6, wherein the spit openings are sized for aerosol collection of a print substance emitted by a portion of a printbar of the printing device.

10. A printing device, comprising:
- a printbar to emit a print substance onto print media; and
- a platen comprising:
  - a first spit opening located at a first side of the platen; and
  - a second spit opening located at a second side of the platen, the spit openings each comprising an angled lead-in edge to facilitate travel of the print media in the printing device;
  - wherein the printbar is to emit a print substance into the first spit opening and the second spit opening from a subset of nozzles that are unused due to a width of the print media being less than a width of the printbar.

11. The printing device of claim 10, wherein the printbar is to print on a continuous roll of print media while unused portions of the printbar spit into the spit openings.

12. The printing device of claim 10, wherein the angled lead-in edge of the spit openings comprises multiple angles, interrupted angles or a curve.

13. The printing device of claim 10, wherein the spit openings are sized for a first print media size, and wherein the platen is interchangeable for a second platen having spit openings sized for a second print media size.

* * * * *